US010602417B2

(12) United States Patent
Vemuri et al.

(10) Patent No.: US 10,602,417 B2
(45) Date of Patent: Mar. 24, 2020

(54) SYSTEMS AND METHODS FOR UPDATING USER DEVICE SETTINGS BASED ON DEVICE DATA

(71) Applicant: Verizon Patent and Licensing Inc., Arlington, VA (US)

(72) Inventors: Bharadwaj Vemuri, Bear, DE (US); Binaben Dipesh Patel, Franklin Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/908,937

(22) Filed: Mar. 1, 2018

(65) Prior Publication Data

US 2019/0274082 A1   Sep. 5, 2019

(51) Int. Cl.
*H04W 36/30*     (2009.01)
*H04M 7/00*      (2006.01)
*H04W 36/00*     (2009.01)
*H04W 24/02*     (2009.01)

(52) U.S. Cl.
CPC ......... *H04W 36/30* (2013.01); *H04M 7/0057* (2013.01); *H04W 36/0022* (2013.01); *H04W 36/0083* (2013.01); *H04W 24/02* (2013.01)

(58) Field of Classification Search
CPC ............................ H04W 36/30; H04M 7/0057
USPC .......................................................... 455/436
See application file for complete search history.

(56) References Cited

U.S. PATENT DOCUMENTS

| 2007/0142050 A1* | 6/2007  | Handforth ............ H04W 36/32 455/436 |
| 2015/0282013 A1* | 10/2015 | Kim .................... H04L 65/1069 370/331 |
| 2016/0373944 A1* | 12/2016 | Jain ........................ H04L 43/50 |
| 2017/0164195 A1* | 6/2017  | Stammers ............. H04W 12/06 |

* cited by examiner

*Primary Examiner* — Chuck Huynh

(57) ABSTRACT

A system described herein improves user equipment ("UE") access to call and data services provided by a network carrier by updating settings on the UE based device data from the UE. The updates may modify the UE hardware configuration, including activating or deactivating different network radios of the UE, enable or disable different call or data services accessed through the different network radios, and/or modify parameters controlling UE network selection and switching (e.g., handoff). In doing so, the system may improve the user experience when accessing wireless services of the network carrier and resolve quality issues whether due to poor signal strength, congested networks, or excessive network switching.

20 Claims, 8 Drawing Sheets

SYSTEMS AND METHODS FOR UPDATING USER DEVICE SETTINGS BASED ON DEVICE DATA

BACKGROUND

A network carrier may provide subscriber user equipment ("UE") access to voice and data services through two or more different networks or network technologies. For instance, a network carrier may operate a Code-Division Multiple Access ("CDMA") network, a Universal Mobile Telecommunications System ("UMTS") third generation ("3G") network, a Long-Term Evolution ("LTE") fourth generation ("4G") network, and/or a Next Generation Mobile Networks ("NGMN") fifth generation ("5G") network, with each network providing different capacity and performance with respect to call and/or data access.

UEs can switch between these networks when sending and receiving calls and data. UEs initially select a network based on signal strength, speed, capacity, and access permissions. As UEs move across a network service region or to different network service regions, the network conditions and parameters change. To prevent service interruption or loss, UEs may switch from a weaker network (e.g., a network with which a UE has a weaker connection) to a stronger network or from a congested network to an uncongested network. For instance, network switching, also referred to as "handover" or "handoff", can transition a Voice Over LTE ("VoLTE") call established over an LTE network to a Voice Over WiFi ("VoWiFi") call traversing a WiFi network. This network switch may occur in response to the 4G LTE network coverage falling below a threshold or the 4G LTE service region becoming congested.

Users may however configure UE settings or have default UE settings that limit access to one or more networks. For instance, users may deactivate wireless radios for accessing different networks or disable features or services (e.g., VoLTE, VoWiFi, etc.) on one or more networks because of user configuration preferences, power consumption, network access cost, privacy, or other reasons. This in turn disables UE access to one or more networks and prevents or at least limits the different networks over which call and data services of the network carrier can be accessed.

DETAILED DESCRIPTION OF PREFERRED EMBODIMENTS

The following detailed description refers to the accompanying drawings. The same reference numbers in different drawings may identify the same or similar elements.

Systems and/or methods, as described herein, improve user equipment ("UE") access to call and data services provided by a network carrier based on the network carrier, and more specifically, a UE update component ("UUC") of the network carrier directly or indirectly updating settings on the UE. The UUC may detect service issues that a particular UE is experiencing or is likely to experience, and update settings of the particular UE that improve or resolve these issues based on device data from that particular UE and/or other UEs. In some embodiments, the updated settings modify the UE hardware configuration. For instance, the updated settings may activate or deactivate different network radios of the UE, and enable or disable different call or data services accessed through the different network radios. In some embodiments, the updated settings control UE network selection and switching (e.g., handover and/or handoff).

The UUC may update the UE settings for access to a best performing network from different available networks. The UUC may also update the UE settings to preemptively resolve network issues that cause or lead to dropped calls, dropped data connections, poor call quality, slow data access, or call and data instability based on real-time, or near-real time, device data provided by the UE and/or other UEs. In particular, using the device data provided by other UEs, alone or in conjunction with device data from a particular UE, the UUC can detect and resolve network issues for the particular UE before the particular UE experiences those network issues. In summary, the UUC may enhance the existing UE network switching functionality by updating states/values of one or more UE settings to enable physical access to the best performing networks when prior states/values of the one or more UE settings disable physical access to these best performing networks, to enable feature and/or functional access on the best performing networks when prior states/values of the one or more UE settings restrict feature and/or functional access, and to select the best performing networks when prior states/values of the one or more UE settings produce a sub-optimal selection from repeated switching or prioritization of a sub-optimal network. In doing so, the UUC updates may reduce network congestion, enhance call quality, improve network reliability, and provide automatic subscriber and UE support.

Figure 1:
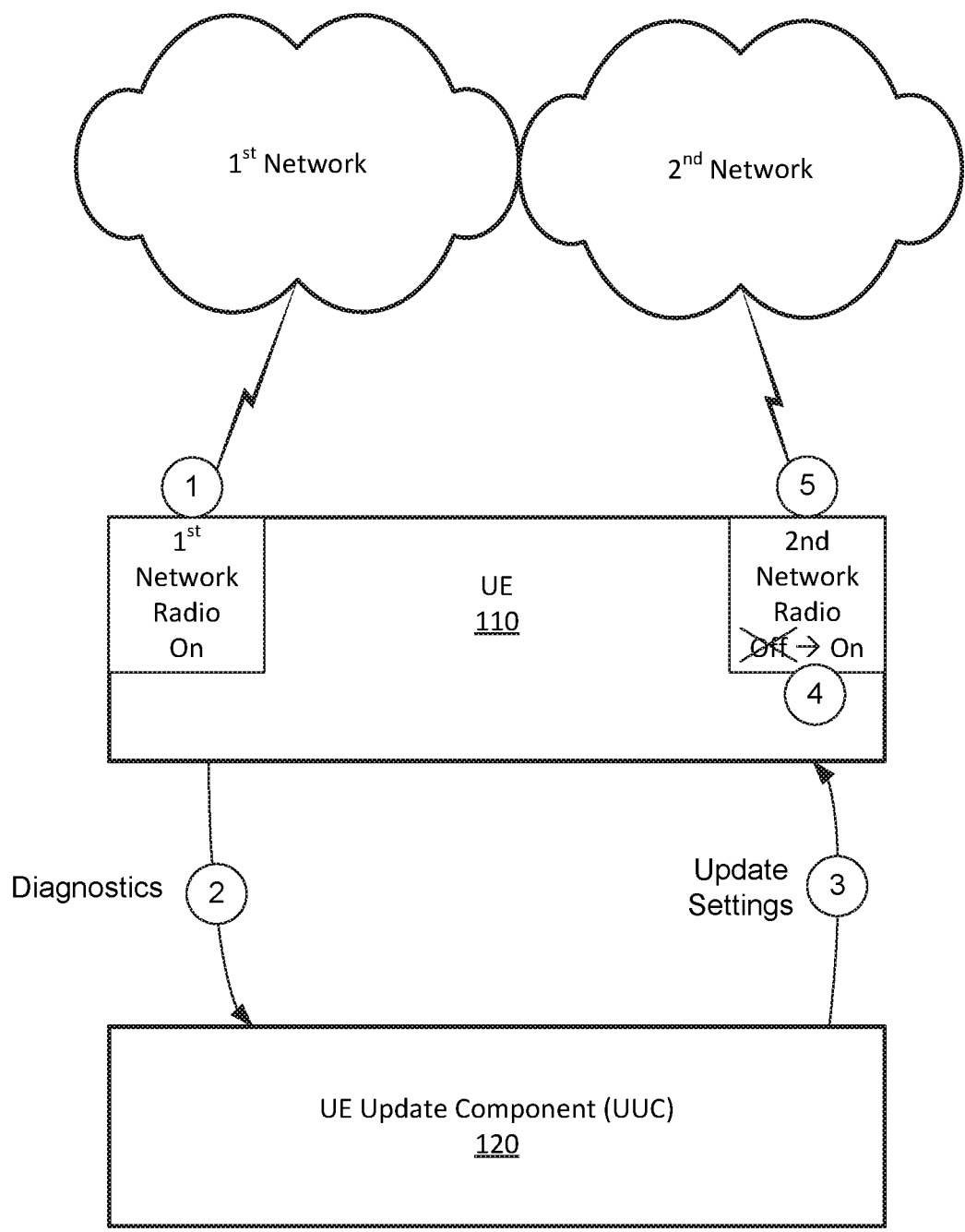
FIG. 1 illustrates an overview of one or more embodiments described herein.

For example, as shown in FIG. 1, UE 110 may access call or data services of a network carrier through a first network. Wireless access to the first network is provided by a first network radio of UE 110. UE 110 may also include a different second network radio for accessing the call or data services of the network carrier through a different second network, although the second network radio may be powered off and/or otherwise deactivated (e.g., due to a specific UE setting) at the time the call or data services are accessed through the first network.

UE 110 may send device data to UUC 120 while accessing the call or data services of the network carrier through the first network. As some examples, the device data may indicate the service being accessed (e.g., call or data), the radio access network ("RAN") or radio access technology ("RAT") used to access the service, connectivity errors, signal quality (e.g., signal-to-noise ratio, signal-to-interference ratio, signal-to-interference-plus-noise ratio, packet loss, packet latency, jitter, bandwidth, and/or other metrics that may be indicative of signal quality), other available networks, current states of some UE settings, performance metrics of an available or connected network, and/or other suitable information.

In response to the device data, UUC 120 may update one or more settings of UE 110 (e.g., by sending a request, command, or other instruction to change one or more settings of UE 110). In some embodiments, the request, command, or other instruction may identify the one or more settings of UE 110 and provide different states or values for those settings. UUC 120 may also update the settings of UE 110 by directly adjusting the one or more settings on UE 110 through secure and/or privileged access that may be provided by UE 110 user or as a condition of UE 110 accessing call and/or data services of the network carrier. In FIG. 1, UUC 120 causes the second network radio of UE 110 to be activated by changing (e.g., via request, command, instruction, or direct adjustment) the specific UE setting controlling the second network radio (e.g., the setting that caused the second network radio to be powered off and/or deactivated).

Assume that the second network provides better call and data quality than the first network. Accordingly, in response to the activation of the second network radio, UE 110 may switch from the first network to the second network, and resume accessing call or data services through the second network.

The direct updating illustrated in FIG. 1 involves UUC 120 changing the settings on UE 110 without user involvement. Direct updating may be performed in response to receiving user consent, and may be performed on a UE supporting the direct update. If direct updating is restricted or unsupported by UE 110, indirect updating of the UE settings can be performed. Indirect updating may include UUC 120 initiating the updating of specific UE settings by providing customized messaging for user actions to effectuate the settings updates. The messaging may also include a script that the user can invoke upon verifying and confirming the one or more suggested updates to the settings. Invocation of the script may then automatically update the implicated UE settings.

Figure 2:
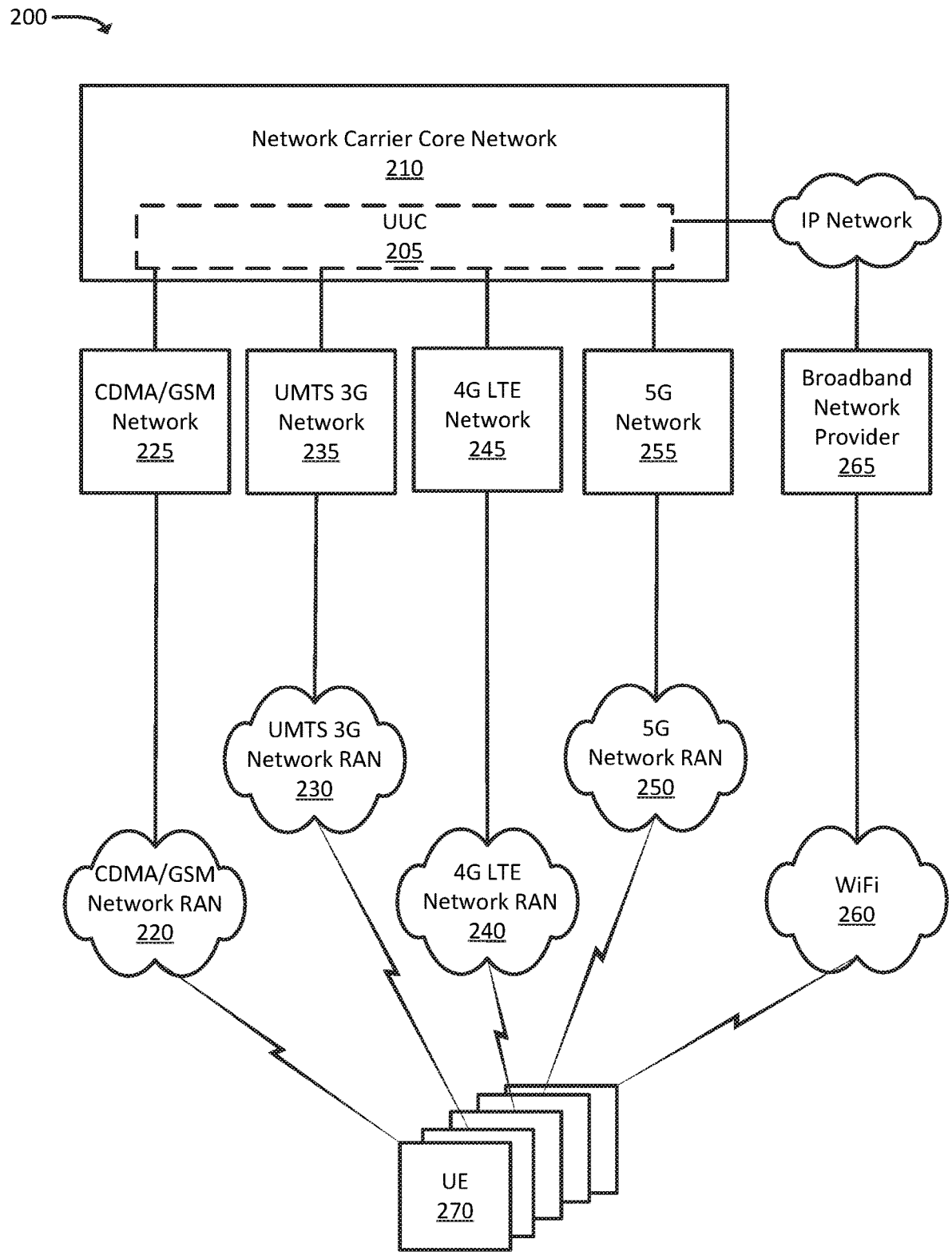
FIG. 2 illustrates an example environment in which one or more embodiments, described herein, may be implemented.

FIG. 2 illustrates an example environment 200 in which one or more embodiments, described herein, may be implemented. FIG. 2 illustrates UUC 205 operating within core network 210 of the network carrier.

The network carrier may be a mobile network operator or telecommunications network operator. Core network 210 may provide subscriber UEs (e.g., one or more UEs 270) access to call and data services through two or more different RANs 220, 230, 240, 250, and 260 of two or more different networks including (i) a Code-Division Multiple Access ("CDMA"), Global System for Mobile Communications ("GSM"), Evolved High Rate Packet Data ("EHRPD") network, or other first or second generation wireless network 225, (ii) a Universal Mobile Telecommunications System ("UMTS") third generation ("3G") network 235, (iii) a fourth generation ("4G") Long-Term Evolution ("LTE") network 245, (iv) a Next Generation Mobile Networks ("NGMN") fifth generation ("5G") network 255, and/or (v) an Institute of Electrical and Electronics Engineers ("IEEE") 802.11 WiFi network 265. This listing is illustrative and not intended to be restricting or limiting of the different networks through which a subscriber UE can access call and data services of the network carrier.

UUC 205 may be a standalone device, distributed set of devices, or application within core network 210. As described herein, UUC 205 may be receive device data and update settings of a subset or all subscriber UEs of the network carrier.

UUC 205 may be also integrated within various network equipment of core network 210. For example, UUC 205 may execute on or as part of an Access and Mobility Management Function ("AMF"), Session Management Function ("SMF"), Policy Control Function ("PCF"), Application Function ("AF"), User Plane Function ("UPF"), and/or other network equipment in core network 210.

UEs 270 may include any computation and communication devices that are capable of communicating with one or more of networks 225, 235, 245, 255, and/or 265. For example, UEs 270 may include devices that receive content, such as web pages (e.g., that include text content and/or image content), streaming audio and/or video content, and or other content, via an Internet connection and/or via some other delivery technique. UEs 270 may, additionally or alternatively, access voice or calling services over one or more of network 225, 235, 245, 255, and/or 265. In some implementations, each UE 270 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device. More specifically, each UE 270 may include at least one wireless network radio for connecting to and accessing call and/or data services of the network carrier through one or more of the RANs 220, 230, 240, 250, and 260.

Although FIG. 2 illustrates UUC 205 executing within core network 210, the network carrier can alternatively, or additionally, integrate or implement some or all of UUC 205 functionality on subscriber UEs 270 for local execution thereon. Executing UUC 205 locally on UEs 270 may provide a distributed and localized system for call and data improvements using device data. This distributed and localized system may remove the network latency associated with UEs 270 sending device data to UUC 205, and UUC 205 updating the settings of UEs 270 over one or more of networks 225, 235, 245, 255, and 265. Implementing UUC 205 in core network 210 may allow for the updated settings to be based on device data from more than one of UEs 270 as will be discussed below.

Still some other embodiments provide a hybrid solution with a central UUC 205 executing in core network 210 ("remote UUC") and distributed UUCs executing on UEs 270 ("local UUCs"). The local UUCs can obtain device data, updated settings, and other data from the remote UUC in response to different triggering events, time, or remote UUC configuration of the local UUCs as some examples.

For instance, UE 270 may enter a particular network service region (e.g., may be located within a particular geographical area). Upon entering the particular network service region, the local UUC of UE 270 may provide a message or other signal to the remote UUC, indicating that the UE has entered the particular network service region, and/or indicating a present geographical location of UE 270.

The remote UUC can provide the local UUC with device data or updated settings from other UEs 270 having previously entered the particular network service region. The local UUC may then determine which, if any, UE settings to change on the corresponding UE 270 based on the additional device data that other UEs 270 previously at the particular network service region provided to the remote UUC, or based on past updates the remote UUC generated for those other UEs 270.

Alternatively, or additionally, the remote UUC can generate and provide the local UUC with updated settings for UE 270 of the local UUC. In this example, the local UUC defers to the remote UUC, and may modify settings of the corresponding UE 270 based on the updates generated by the remote UUC. The updated settings from the remote UUC can preemptively resolve service issues that previous UEs 270 experienced upon entering the particular network service region. For example, if the remote UUC determines that UE 270 is approaching (e.g., based on a present location and one or more previous locations, which may indicate a heading and/or speed of UE 270) a particular geographic region for which the remote UUC has previously provided a particular type of instruction, the remote UUC may provide the same type of instruction to UE 270. In some embodiments, the instruction may be a delayed instruction (e.g., may indicate that UE 270 should not execute the instruction immediately upon receipt; instead the instruction may indicate that UE 270 should execute the instruction after a given duration of time, at a certain time, or upon arriving at a particular geographic location). The updated settings from the remote UUC can also be used to manage the network resources and prevent congestion (e.g., switch a subset of UEs 270 from a congested first network to an uncongested second network).

UUC 205, whether operating in a device of network carrier core network 210 or implemented as a component on UEs 270, may include a non-transitory computer-readable medium storing a set of processor-executable instructions and one or more processors. The processors are configured to execute the set of processor-executable instructions for the purpose of receiving and analyzing the device data, generating and distributing the UE settings updates that improve the service of quality for the targeted UEs, and/or performing one or more functions described herein.

UUC 205 may update UE settings based on UE device data. In particular, UUC 205 may update the UE settings based on UE device data that identifies service issues that the UE is experiencing or is likely to experience if continuing to access services through a particular network. The device data may be passed to UUC 205 in real-time, or near real-time, from UEs 270 in response to triggering events. The device data may be passed over one or more networks to which UEs 270 have access, including WiFi, LTE, 1x, and/or UMTS/GSM networks, and in one or more formats supported by the accessible networks (e.g., a data packet, Short Messaging Service ("SMS") or text message, and/or some other suitable format). The device data can be pushed or pulled from UEs 270 to UUC 205 in response to the triggering events. The network carrier may configure UEs 270 to produce and push the device data at the triggering events. Alternatively, UUC 205 may pull the device data in real-time using network carrier control messaging. The device data can also be continually or periodically passed if desired or more data granularity improves UUC 205 function with respect to improving UE access to network carrier service through the direct or indirect updating of UE settings.

Figure 3:
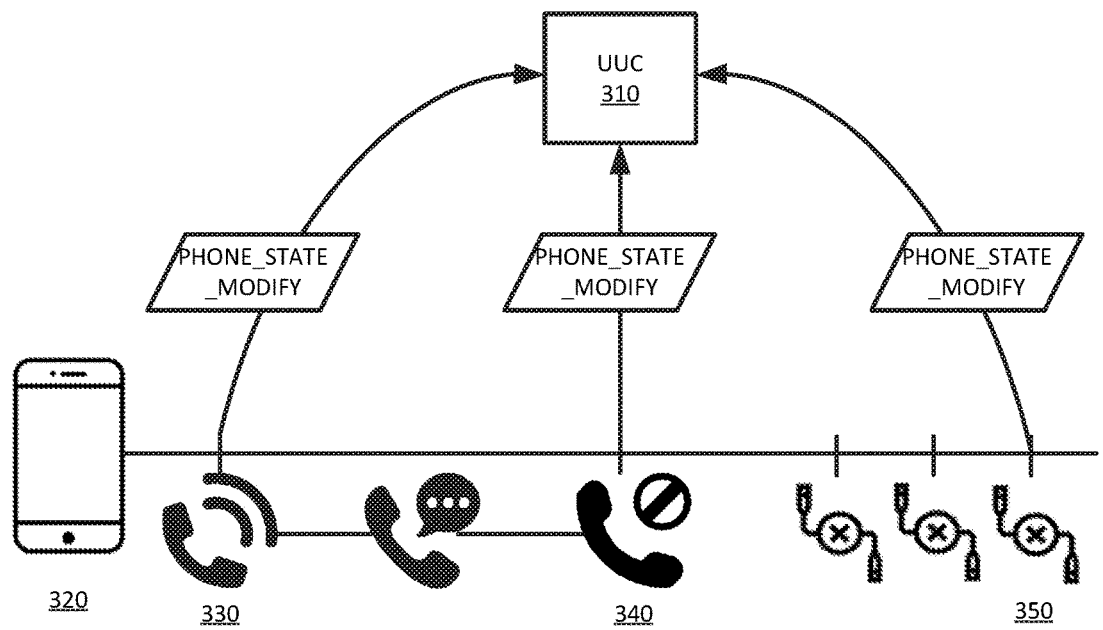
FIGS. 3 and 4 illustrate triggering events at which device data may be provided by UE to a UE Updating Component ("UUC").

FIG. 3 illustrates UUC 310, UE 320, and triggering events 330, 340, and 350 at which device data may be provided by UE 320 to UUC 310, in accordance with some embodiments. UE 320 may be one of UEs 270 from FIG. 2. UUC 310 may be UUC 205 executing from core network 210 or a UUC executing on UE 320.

As shown in FIG. 3, UE 320 may provide a message (e.g., a PHONE_STATE_MODIFY with a first set of values) to UUC 310 in response to the first event 330 triggering as a result of UE 320 establishing or connecting an incoming or outgoing call. UE 320 may also provide an updated message (e.g., a PHONE_STATE_MODIFY message with a different second set of values) to UUC 310 in response to the second event 340 triggering as a result of the call disconnecting or dropping, and also in response to the third event 350 triggering as a result of a threshold number of consecutive call setups attempted by UE 320 that fail (e.g., three failed attempts shown in FIG. 3).

Each message may provide UUC 310 with real-time data about UE settings, network parameters, and network service quality as experienced by UE 320. For example, the message provided by UE 320 (e.g., PHONE_STATE_MODIFY) may indicate a call type (e.g., voice or video), a RAN or RAT being accessed (e.g., LTE, 1X, WiFi, GSM/UMTS), a call fail reason (if the triggering event is a call failure or drop) in a string format (e.g., "LowSignal", "RegistrationFail", etc.), a call state (e.g., ringing, connected, idle, etc.), a call direction (e.g., outgoing from UE 320 or incoming to UE 320), and whether UE 320 is roaming. Other network parameters or network service quality values that can be provided with the message include whether various radios are active or inactive (i.e., may indicate which radios, of UE 320, are active or inactive), whether call services VoLTE and VoWiFi are enabled or disabled via one or more settings of UE 320, and other available networks (e.g., WiFi networks that are in range of UE 320) and their corresponding signal quality.

Figure 4:
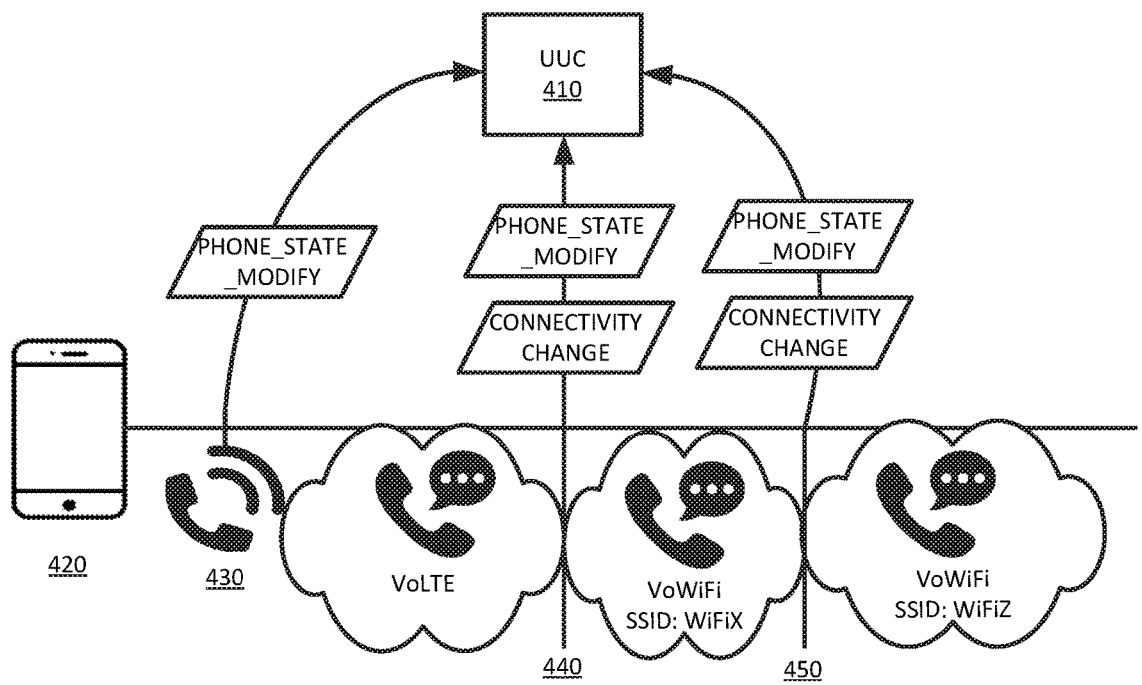

FIG. 4 illustrates UUC 410, UE 420, and different triggering events 430, 440, and 450 at which UE 420 may provide device data to UUC 410, in accordance with some embodiments. Here again, UE 420 may be one of UEs 270 from FIG. 2, and UUC 410 may execute within core network 210 or on UE 420.

As with FIG. 3, UE 420 may provide a first message (e.g., PHONE_STATE_MODIFY) to UUC 410 in response to the first event 430 triggering as a result of UE 420 establishing or connecting an incoming or outgoing call. However, unlike FIG. 3, UE 420 may provide one or more additional messages (e.g., a CONNECTIVITY_CHANGE message in addition to, or in lieu of, a PHONE_STATE_MODIFY message) to UUC 410 in response to at least the second event 440 triggering as a result of the call switching from a first network (i.e., LTE in this example) to a different second network (i.e., WiFi in this example) and UE 420 connecting to a RAN of the second network. Similarly, UE 420 may provide updated messages (e.g., PHONE_STATE_MODIFY and CONNECTIVITY_CHANGE) to UUC 410 in response to at least the third event 450 triggering as a result of the call switching between WiFi networks (i.e., from WiFi_X to WiFi_Z in this example).

The different messages (e.g., PHONE_STATE_MODIFY vs. CONNECTIVITY_CHANGE) may be provided because different information may be relevant for the different events. For example, the CONNECTIVITY_CHANGE message may provide the current and previous RAN or RAT for the call, as well as quality parameters and performance metrics associated with each RAN or RAT (e.g., signal strength, packet loss, throughput, bandwidth, latency, etc.).

User-initiated change of UE settings are examples of other events that may trigger the pushing or pulling of device data (e.g., a SETTING_CHANGE message) from UEs 270 to UUC 205. These events may include activating or deactivating radios for accessing different networks (e.g., WiFi radio, LTE radio, etc.) and enabling or disabling service features for the different network (e.g., VoWiFi, VoLTE, etc.). In such cases, the device data may include key-value pairs, with the key corresponding to the modified UE setting and the value corresponding to the changed state of the modified UE setting. In addition to providing the new state for a modified UE setting, the value of the key-value pair can also include the previous state for the modified UE setting.

Figure 5:
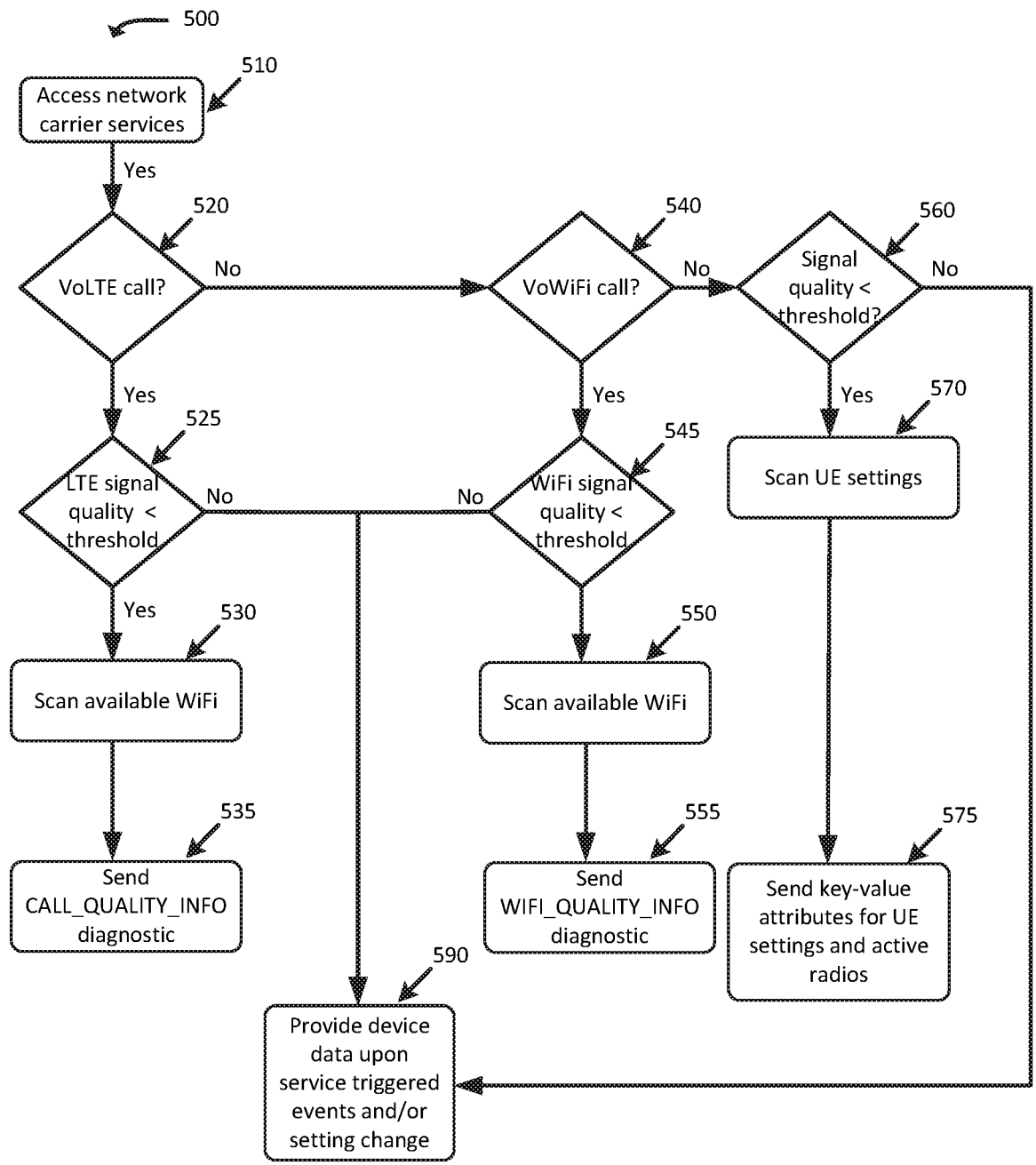
FIG. 5 illustrates an example process for triggering different events and the corresponding device data provided by a UE to the UUC.

FIG. 5 illustrates an example process 500 for triggering different events and the corresponding device data provided by UE 270 to UUC 205. The process 500 may, in some embodiments, be performed by UEs 270.

Process 500 may include accessing (at 510) one or more network carrier services, including call services or data services. For example, UE 270 may establish a call and/or a data session via a given RAN, using a corresponding RAT. Accessing the network carrier services may also include UE 270 continuing an accessed service on a first RAN, using a corresponding first RAT, or switching the existing access to a different second RAN, using a corresponding second RAT. UE 270 may identify the RAT, via which the service is accessed.

In some embodiments, different triggering events may be associated with different RATs and the service that is accessed (e.g., call or data). For instance, in response to determining (at 520—YES) that UE 270 is involved in a VoLTE call, whether a newly initiated VoLTE call or an existing call (e.g., a call that uses a technique other than VoLTE) switching to a VoLTE call, UE 270 may monitor various network parameters related to signal quality over the LTE network, such as packet delay, packet loss, jitter, bandwidth, and/or other parameters related to signal quality. The signal quality may be monitored against one or more thresholds. The thresholds may be indicative of a poor quality call connection (e.g., due to a congested LTE service region or low signal strength between UE 270 and the LTE RAN). For instance, packet delay, packet loss, and/or jitter may each be associated with respective thresholds, where measures of packet delay, packet loss, and/or jitter that are higher than the respective thresholds indicate a "poor" quality connection. As another example, throughput may be associated with a threshold, where a measure of throughput that is below the respective threshold is indicative of a "poor" quality connection.

As used herein, the term "fall below" (with respect to a threshold) may be used to indicate that a particular metric is below a threshold or above a threshold that is indicative of a poor quality connection, as appropriate in the context of the given metric. For example, when measured in terms of packet delay or packet loss, signal quality may be considered as "falling below" respective thresholds, that are indicative of a poor quality connection, when the measures of packet delay and/or packet loss are higher than the respective thresholds (i.e., more packet delay and/or packet loss than "acceptable" thresholds). Similarly, when measured in terms of throughput, signal quality may be considered as "falling below" a threshold, that is associated with a poor quality connection, when the measure of throughput is lower than the threshold.

Additionally, while the following description is made in the context of "signal quality" falling below or exceeding a given threshold, in some embodiments, the "signal quality" may be indicated by a score that is a function of one or more metrics. For example, in situations where signal quality is determined based on packet delay, packet jitter, and throughput, an overall "signal quality" score may be generated based on measures of packet delay, packet jitter, and throughput. For instance, a score may be assigned to each of these metrics (e.g., a normalized score on the same scale, such as between 0 and 100), and the overall "signal quality" score may be an average, sum, median, minimum, maximum, and/or other aggregation of these individual scores. On the other hand, in some embodiments, each different metric may be associated with a given threshold, and if one or more of the metrics fall below their respective thresholds, then the signal quality (that is based on the one or more metrics) may be considered as "falling below a threshold signal quality."

In response to determining (at 525—YES) that the LTE signal quality (e.g., as determined from the monitored LTE network parameters) falls below a signal quality threshold (e.g., an LTE signal quality threshold), process 500 may include scanning (at 530) for available WiFi networks and sending (at 535) a message (e.g., CALL_QUALITY_INFO) to UUC 205. In some embodiments, the message (e.g., CALL_QUALITY_INFO) may indicate the RAT for the call (e.g., LTE in this scenario), the LTE signal strength or quality in terms of Received Signal Strength Indicator ("RSSI"), Reference Signal Received Power ("RSRP"), Reference Signal Received Quality ("RSRQ"), and/or other LTE parameters. The message (e.g., CALL_QUALITY_INFO) can also provide WiFi scan results from 530, including the Service Set Identifier (SSID) of any available WiFi networks and their signal strength or quality.

In response to determining (at 525—NO) that the LTE signal quality (e.g., as determined from the monitored LTE network parameters) does not fall below a signal quality threshold during the VoLTE access, process 500 may provide (at 590) device data for events, unrelated to LTE service quality, that occur during the VoLTE service access. The device data for these events may be sent periodically or intermittently during the VoLTE service access. For instance, process 500 may provide device data at termination or switching of the VoLTE access (e.g., PHONE_STATE_MODIFY and/or CONNECTIVITY_CHANGE messages) or changing of one or more UE settings (e.g., SETTING_CHANGE messages).

If, on the other hand, the accessed service is not a VoLTE call (at 520—NO), process 500 may include determining (at 540) whether the accessed service is VoWiFi call. In response to determining (at 540—YES) that the call is a VoWiFi call, whether from a newly initiated call or an existing call switching to VoWiFi access, UE 270 may monitor various network parameters related to signal quality over the WiFi network, such as decibel-milliwatts ("dBm"), RSSI, packet delay, packet loss, jitter, and bandwidth as some examples. Here again, the WiFi signal quality may be monitored against one or more thresholds that may be indicative of a poor quality WiFi connection.

In response to determining (at 545—YES) that the WiFi signal quality (e.g., as determined from the monitored WiFi network parameters) falls below a signal quality threshold (e.g., a WiFi signal quality threshold), process 500 may include scanning (at 550) for available WiFi networks and sending (at 555) a message (e.g., WIFI_QUALITY_INFO) to UUC 205 that may identify the SSID of the currently connected to WiFi network, the strength of the connected WiFi network, and a list of SSIDs for available WiFi networks and their signal strengths (determined at 550). The message (e.g., WIFI_QUALITY_INFO) may additionally provide signal strength information of an LTE network, 5G network, and/or other type of network if accessible by UE 270.

In response to determining (at 545—NO) that the WiFi signal quality (e.g., as determined from the monitored WiFi network parameters) does not fall below a signal quality threshold, process 500 may provide (at 590) device data for events (which may be unrelated to WiFi signal quality) that occur during the VoWiFi service access. The device data for these events may be sent periodically or intermittently during the VoWiFi service access. For instance, process 500 may provide device data (e.g., a PHONE_STATE_MODIFY message) when the VoWiFi call terminates, device data (e.g., a CONNECTIVITY_CHANGE message) when the VoWiFi call switches to a VoLTE call, or device data (e.g., a SETTING_CHANGE message) when a network radio is activated or deactivated on UE 270.

When determining (at 520—NO and at 540—NO) that the accessed service is neither a VoLTE call nor a WiFi call (e.g., a data session, a call over a CDMA network, or some other type of session or call), UE 270 may monitor various network parameters for the signal quality between UE 270 and the network via which the service is accessed. For a data session over an LTE network, UE 270 may monitor LTE signal quality (e.g., RSSI, RSRP, RSRQ, and/or other LTE network parameters) as well performance of the LTE network (e.g., throughput, packet loss, packet latency, and/or other performance metrics). Should the monitored network parameters indicate (at 560—YES) that the signal quality falls below a specific threshold, process 500 may include scanning (at 570) various UE settings (e.g., which wireless network radios of UE 270 are active or inactive, which connectivity modes (e.g., VoLTE, VoWiFi, etc.) are active or inactive) and sending (at 575) the scanning results as device data to UUC 205. The scanning results can, for example, include key-value attributes, with the key representing a specific UE setting, and the value indicating the current state or value for the associated UE setting (e.g., WiFi:On, VoWiFi:Off, LTE:On, VoLTE:On, CallPreference:CDMA, etc.). Stated differently, the scanning results may indicate available options (e.g., alternative networks) to which the accessed service can be switched or a subsequent service can be accessed.

If the monitored network parameters identify that the signal quality is not lower than the threshold (at 560—NO), then process 500 may include sending (at 590) other device data for service-specific events. For instance, UE 270 streaming a video over an LTE network may send device data to UUC 205 at the start of the stream, once packet loss or delay reaches a threshold, after sending or receiving a given amount of data (e.g., a predetermined number of bytes), in response to switching from the LTE network to another network (e.g., a WiFi network), and at the end of the stream, and/or based on one or more other events.

Based on the UE device data, the network carrier (e.g., UUC 205 of the network carrier) may detect service quality experienced by UEs 270 and/or network performance metrics even if UEs 270 are accessing services on the network of another network carrier or provider (e.g., a WiFi network of a different broadband provider). In some embodiments, UUC 205 may detect the service quality experienced by a particular UE 270 based on the device data from that particular UE 270, and additionally, device data from nearby UEs 270 or UEs 270 on the same networks.

UUC 205 may directly or indirectly update settings of a particular UE 270 in order to proactively and/or preemptively improve service quality for the particular UE 270 before or while the particular UE 270 accesses services of the network carrier. UUC 205 may update the settings to enable UE 270 to transition from a first network, to which UE 270 is currently connected, to a different second network that may have previously been disabled, unavailable, or deprioritized on UE 270 prior to the updated UE settings made by UUC 205. Through the updated settings, UUC 205 may override UE 270 operation and control or enable the switching of UE 270 to the different second network through which voice and data services can be accessed with better quality than the first network.

UUC 205 may update settings that modify the hardware configuration of UEs 270. In some embodiments, UUC 205 may modify settings that activate or deactivate wireless radios (e.g., LTE, WiFi, etc.) with which UEs 270 access wireless networks 225, 235, 245, 255, 265, and other wireless networks. UUC 205 may, additionally or alternatively, modify settings that enable or disable voice and/or data services on a particular network. For example, UUC 205 can enable or disable VoWiFi or VoLTE, and enable or disable streaming data over LTE on UE 270.

UUC 205 may also update settings that control the switching or handover of UE 270 between different networks. Updating the settings may include updating settings that prioritize one network over another. Network prioritization applies to networks of different RATs (e.g., LTE, WiFi, and 5G) or networks of the same RAT (e.g., WiFi networks with different SSIDs). Network prioritization may be performed from temporarily blacklisting, disconnecting, or causing UE 270 to ignore a first network in order to force selection of a second network. Other UUC updates to UE settings may include modifying parameters and timers based on which UE 270 switches or handoffs between different networks.

The settings updates from UUC 205 may be event or time triggered. An update with an event trigger can be applied or removed upon the one or more triggering conditions for that update being satisfied. For example, an update may include enabling a VoWiFi calling feature upon activation of the WiFi radio on a particular UE 270, wherein activation of the WiFi radio is the trigger that causes the update for the VoWiFi setting to be effectuated. An update with a time trigger may similarly be applied or removed after certain timing conditions are met. For example, UUC 205 can issue an update to a particular UE 270 at a first time of day. The update enables a calling feature (e.g., VoWiFi) on the particular UE 270 at a later second time of day in response to device data from the UE indicating accessibility to a WiFi network at the second time of day. The time trigger can also revert changes. For example, UUC 205 may issue an update that turns a particular setting off (e.g., deactivate the LTE radio). The update is specified with a five minute time trigger. Five minutes after the particular setting is turned off, the update reverts and turns the particular setting on (e.g., activate the LTE radio). In some embodiments, the event or time triggers can be based on temporally qualifying the device data. Temporally qualifying device data may include associating a time or date with the device data. The device data can then be historically analyzed at UUC 205 to detect trends or repeated issues that occur in different networks at different times and dates. UUC 205 may then preemptively resolve the issues with time or event based updates that trigger at the time or date of the repeating issue.

An Over the Air Device Management (OTADM) protocol may allow for the direct updating of the UE settings by UUC 205 when UUC 205 is remote with respect to UE 270 (e.g., when UUC 205 is implemented as within network carrier core network 210). In some embodiments, the OTADM provides secure request and response messaging with which UUC 205 can change the settings of UE 270 without user involvement (e.g., without requiring a user interaction in the process of updating the settings of UE 270). The OTADM messaging can be provided to UE 270 over one or more networks to which UE 270 is connected. In some embodiments, the direct updating is performed using the messaging of the OTADM protocol when UE 270 supports the OTADM protocol, and the user has consented to permit the remote or autonomous changing of UE settings.

In embodiments in which UUC 205 is implemented as a component of UE 270 (e.g., when UUC 205 includes hardware circuitry and/or a software process executed by UE 270), UUC 205 can directly control and adjust the UE settings without remote messaging passing to UE 270 over one or more networks. In some other embodiments, other messaging or other control protocols are used by UUC 205 to directly modify the UE settings without user involvement whether UUC 205 is implemented as a component on UE 270 or is remote from UE 270.

Figure 6:
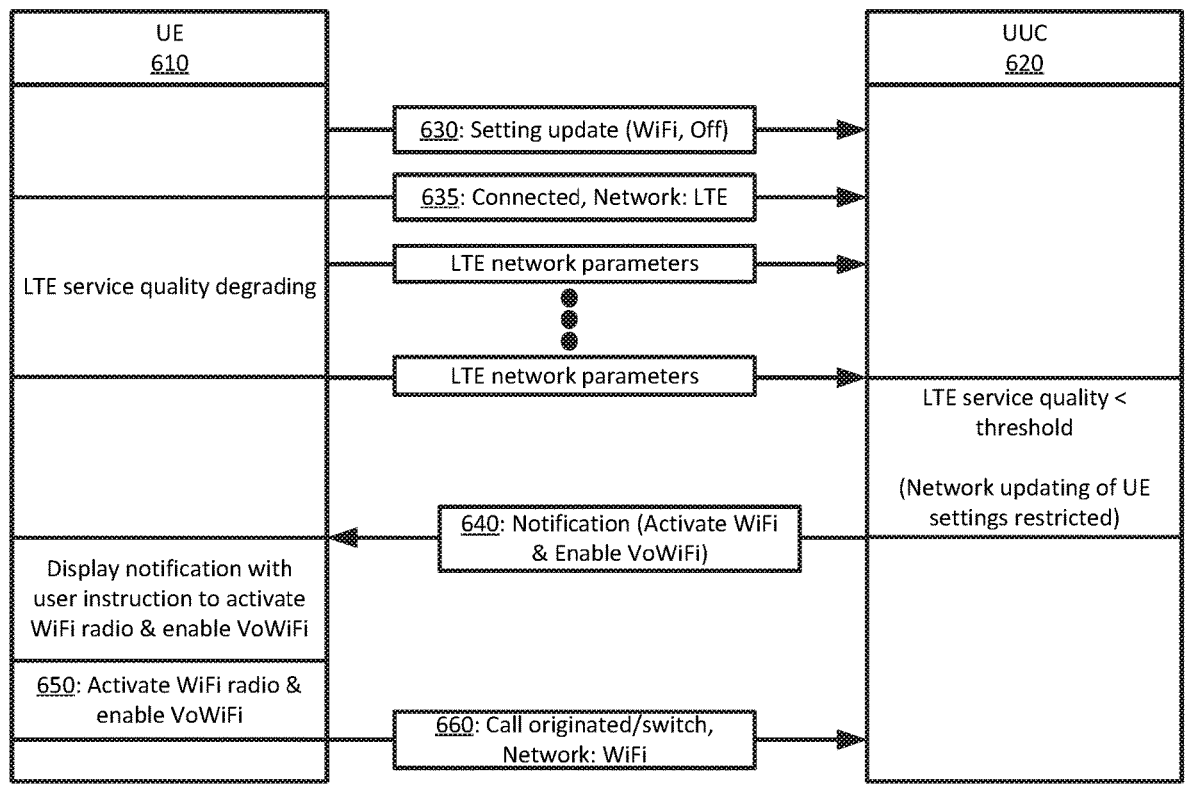
FIG. 6 illustrates an example of indirect updating of UE settings by the UUC based on device data reported by the UE.

UUC 205 may resort to indirect updating of the UE settings when UE 270 does not support the over the air settings updates (e.g., OTADM messaging), or the user has not provided consent for UUC 205 to directly modify UE settings. FIG. 6 illustrates an example of indirect updating of UE settings by UUC 620 based on device data reported by UE 610. UE 610 can be one of UEs 270. UUC 620 can be UUC 205 in core network 210 or a UUC implemented on UE 610.

FIG. 6 illustrates UE 610 providing (at 630) device data to UUC 620 in response to the WiFi radio of UE 610 being deactivated (e.g., a key-value pair indicating that the WiFi radio has been changed to an off state), wherein the deactivation of the WiFi radio triggers an event for sending the device data. UE 610 may provide (at 635) additional device data in response to connecting to an LTE network. Although not shown, other device data (e.g., a PHONE_STATE_MODIFY message) can be sent in response to the origination of a call (i.e., a call initiation attempt) or a data request over the LTE network.

UE 610 may detect service quality of the LTE network degrading. The degraded service quality can be due to changing network parameters, such as increased packet latency, packet loss, jitter, and/or lower throughput as some examples. The degraded service quality can lead to call drops, call origination attempts by UE 610 over the LTE network failing, or slow or unreliable data access. UE 610 provides UCC 620 with device data to indicate the changing network parameters and/or degrading service quality of the connected LTE network.

Once the LTE service quality, as represented by the network parameters in UE 610 provided device data, falls below a threshold, UUC 620 may identify changes to settings of UE 610 that may improve service quality for UE 610. From the device data provided at 630, UUC 620 may determine that the WiFi radio is inactive, and as a result, WiFi calling and WiFi data access on UE 610 is disabled. Based on determining that WiFi calling on UE 610 is disabled, UUC 620 may determine that activating the WiFi radio and enabling WiFi calling may potentially resolve call issues that UE 610 would otherwise experience over the LTE network.

In FIG. 6, assume that UE 610 does not support the direct updating of UE settings by UUC 620, because the user of UE 610 has not consented to the direct updating, or because UE 610 is an unsupported device. Accordingly, UUC 620 defaults to an indirect updating of the UE settings, whereby UUC 620 sends (at 640) a notification to UE 610. The notification can be an SMS message, email, Multimedia Messaging Service ("MMS") message, or other message that is for display on UE 610. In some embodiments, the notification may not cause any changes to the connectivity settings of UE 610 (e.g., may not enable or disable radios or call-related features). Based on receiving the notification, UE 610 may display instructions for the user to perform. For instance, the notification may contain instructions by which the user can activate the WiFi radio and enable the VoWiFi feature of UE 610.

The user may follow the notification instructions and perform the actions indicated in the notification. For instance, the user may input instructions to activate a WiFi radio and/or enable a VoWiFi feature of UE 610, and based on receiving the instructions from the user, UE 610 may activate (at 650) the WiFi radio and/or enable the VoWiFi feature. In some embodiments, the notification includes a script that executes in response to user input. Execution of the script performs the changes to the UE settings after the user consents to the changes.

UE 610 can then connect to a WiFi network that may provide better quality of service than the current LTE network connected to by UE 610. A subsequent call or data access by UE 610 can be can be initiated over the WiFi network, and UE 610 may provide (at 660) device data to UUC 620. For a VoWiFi call, this device data may be a message (e.g., PHONE_STATE_MODIFY) indicating call origination over the WiFi network and other parameters associated with the call or the WiFi network. The device data can pass over the WiFi network, LTE network, or any other network that is available to UE 610.

Figure 7:
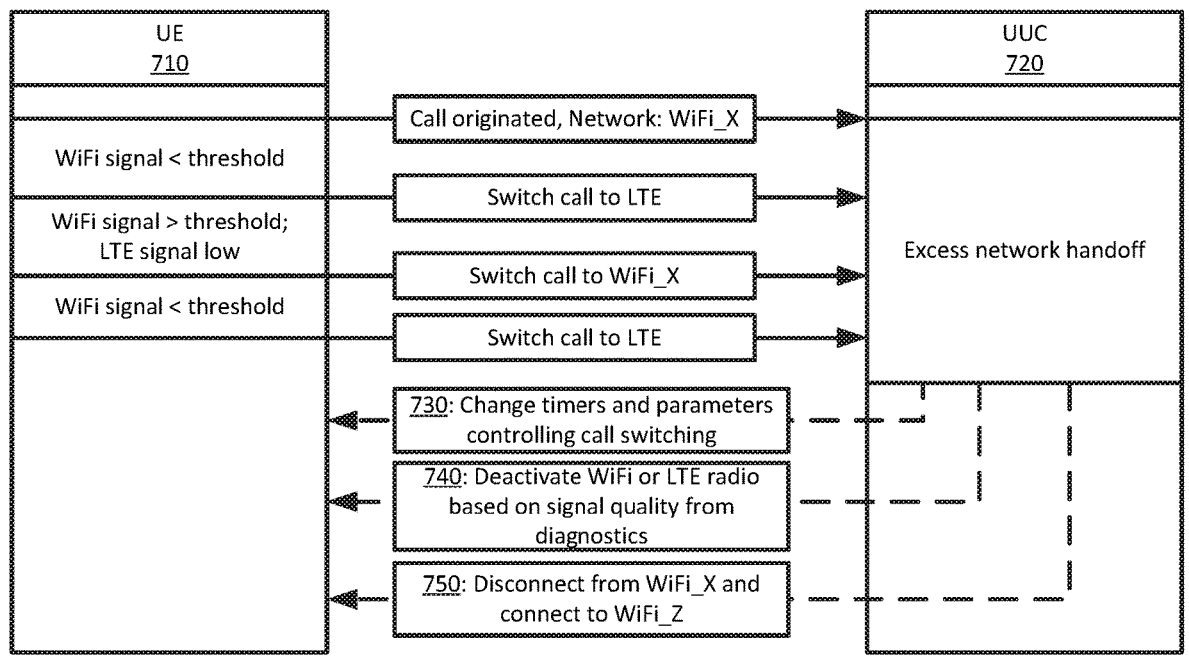
FIG. 7 illustrates an example of the UUC directly updating settings of a UE in response to excessive network switching by the UE.

FIG. 7 illustrates an example of UUC 720 directly updating settings of UE 710 in response to excessive network switching by UE 710. UUC 720 may be UUC 205 executing in core network 210, or as a component of UE 710. UE 710 may represent one of UEs 270 from FIG. 2.

UE 710 may provide device data (e.g., a PHONE_STATE_MODIFY message) to UUC 720 in response to UE 710 initiating, establishing, or otherwise originating a call over a first network (i.e., WiFi_X), and repeated switching of the call between the first network and a different second network (i.e., LTE). UUC 720 may detect a potential service quality issue, based on the excessive switching reported in the device data. Excessive switching can lead to poor call quality because each switch may introduce some delay, jitter, or loss in the call audio. Switching networks in this manner may, in some instances, cause the call to drop.

To resolve the potential quality issues and potentially improve the quality of service experienced by UE 710, UUC 720 directly updates settings of UE 710. FIG. 7 presents three different direct UE settings updates 730, 740, and 750 with which UUC 720 may improve the quality of service for UE 710. In some embodiments, UUC 720 may perform one of these settings updates. In some embodiments, UUC 720 may perform two or more of these settings updates.

UUC 720 may directly update (at 730) a first set of settings on UE 710 related to the timers and parameters controlling the network switching by UE 710. In changing the first set of setting, UUC 720 may improve quality of service for UE 710 by causing UE 710 to remain on one network for a longer period of time. Remaining on a network for a longer period of time, reduces the amount of network switching. This in turn may eliminate some of the jitter, latency, and/or packet loss that is associated with each network switch and that may degrade service quality experienced by UE 710.

Additionally, or alternatively, UUC 720 may directly update (at 740) a second set of settings on UE 710, with the updated settings deactivating the wireless network radio for one of the first network or the second network based on whether the signal strength between UE 710 and the first network is weaker than the signal strength between UE 710 and the second network or vice versa. The device data may provide UUC 720 with real-time information as to the signal strength and other qualities (e.g., packet loss, latency, speed, etc.) of each of the first and second networks. UUC 720 may deactivate the WiFi radio of UE 710 when the LTE network quality is better than the WiFi network quality. Deactivating the WiFi radio causes UE 710 to default to, and remain on, the LTE network. Similarly, UUC 720 deactivates the LTE radio of UE 710 when the LTE network quality is worse than the WiFi network quality, wherein deactivating the LTE radio causes UE 710 to default to, and remain on, the WiFi network. In some embodiments, the updates are temporary, such that the network radio that was disabled may be automatically reenabled by a subsequent update from UUC 720 after some period of time or based on expiration of a timer associated with disabling the corresponding network radio. Should excessive switching reoccur upon reenabling the disabled network radio, UUC 720 can again disable a selected network radio, and extend the timer for that disabled network radio.

UUC 720 can additionally, or alternatively, update (at 750) a third set of settings on UE 730, which relate to which WiFi network UE 730 connects. Part of the device data provided when switching to or from a particular WiFi network may include scan results of other available WiFi networks and the quality or signal strength of the other WiFi networks. In the event that UUC 720 detects a stronger signal between UE 710 and a second WiFi network than between UE 710 and a first WiFi network to which UE 720 is current connected, UUC 720 may update the UE settings to cause UE 710 to connect to the second WiFi network instead of the first WiFi network. The settings update from UUC 720 can change the order with which UE 710 connects to the available WiFi networks. Alternatively, the settings update from UUC 720 can cause UE 710 to disconnect from the first WiFi network and, optionally, disable, ignore, or blacklist the first WiFi network temporarily on UE 710.

Figure 8:
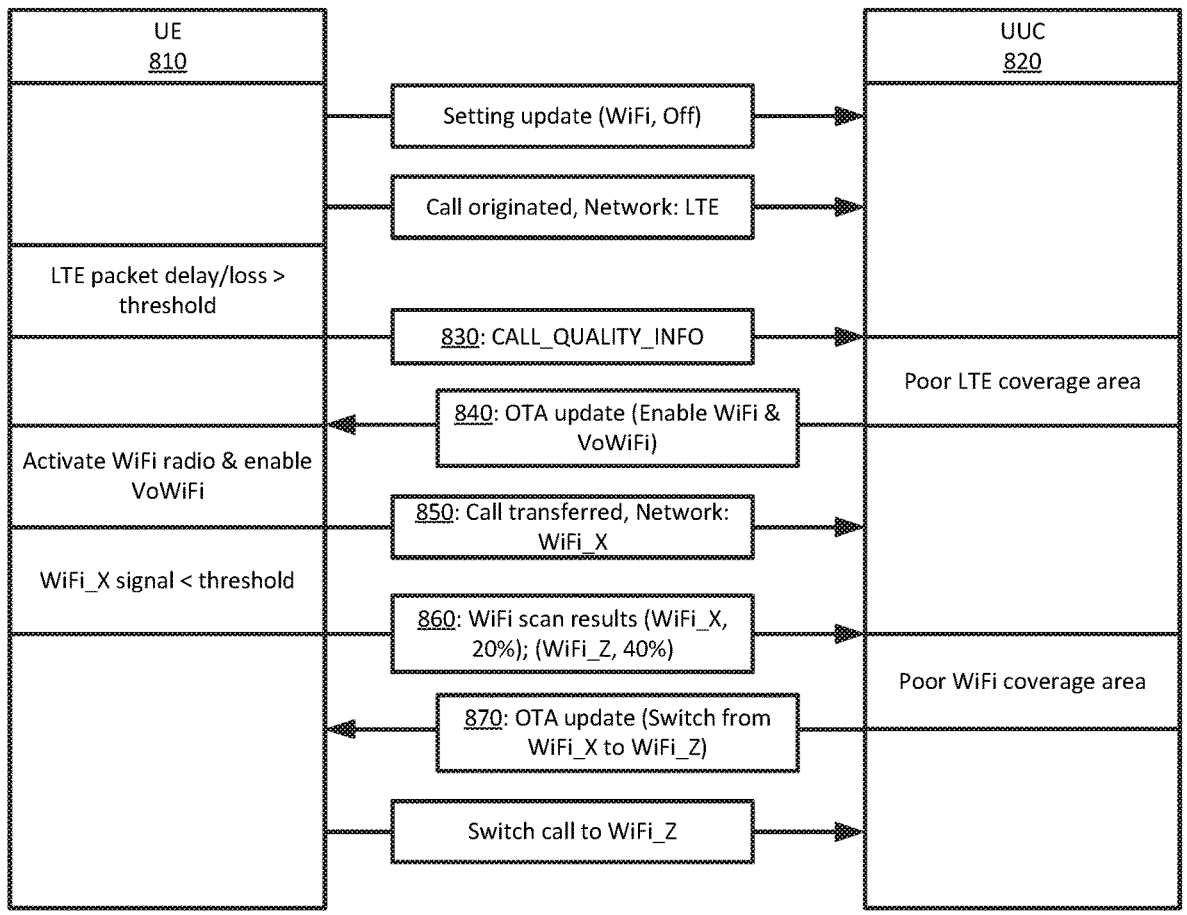
FIG. 8 illustrates an example of the UUC directly updating settings of a UE in response to changing network conditions.

FIG. 8 illustrates an example of UUC 820 directly updating settings of UE 810 in response to changing network conditions. UUC 820 may be UUC 205 executing in core network 210, or a UUC executing as a component of UE 810. UE 810 may be one of UEs 270.

In this figure, UE 810 may provide a first set of device data (e.g., one or more PHONE_STATE_MODIFY messages) to UUC 820 indicating that the WiFi radio of UE 810 has been deactivated, and that a call is originated over an LTE network. UE 810 may experience LTE packet delay or loss in excess of one or more thresholds that cause UE 810 to provide (at 830) additional device data (e.g., a CALL_QUALITY_INFO message in this example) to UUC 820 with real-time, or near real-time, data regarding the potentially degraded quality of the LTE network.

UUC 820 may detect that UE 810 experiences poor quality of service based the provided device data. In response, UUC 820 may provide (at 840) an over the air update (i.e., OTADM message) that activates the WiFi radio and that enables the VoWiFi feature of UE 810 without user involvement. With the WiFi radio activated, the VoWiFi feature enabled, and the signal strength between UE 810 and the WiFi network being better than the signal strength between UE 810 and the LTE network, UE 810 may switch (at 850) the call from the LTE network to the WiFi network, and specifically, a first WiFi network identified by a first SSID (e.g., WiFi_X in this example).

The quality of the first WiFi network may subsequently degrade past a threshold. This may trigger an event that causes UE 810 to provide (at 860) additional device data to UUC 820. The additional device data may identify SSIDs of other available WiFi networks and their corresponding signal strength and/or other qualities. Based on the device data, UUC 820 detects a different second WiFi network (e.g., WiFi_Z in this example) that may provide better performance and service quality than the first WiFi network. Accordingly, UUC 820 may directly update (at 870) a different set of settings on UE 810 controlling WiFi network selection by UE 810. The second update may cause UE 810 to switch from the first WiFi network to the second WiFi network, and continue the call originally originated over the LTE network on the second WiFi network.

Figure 9:
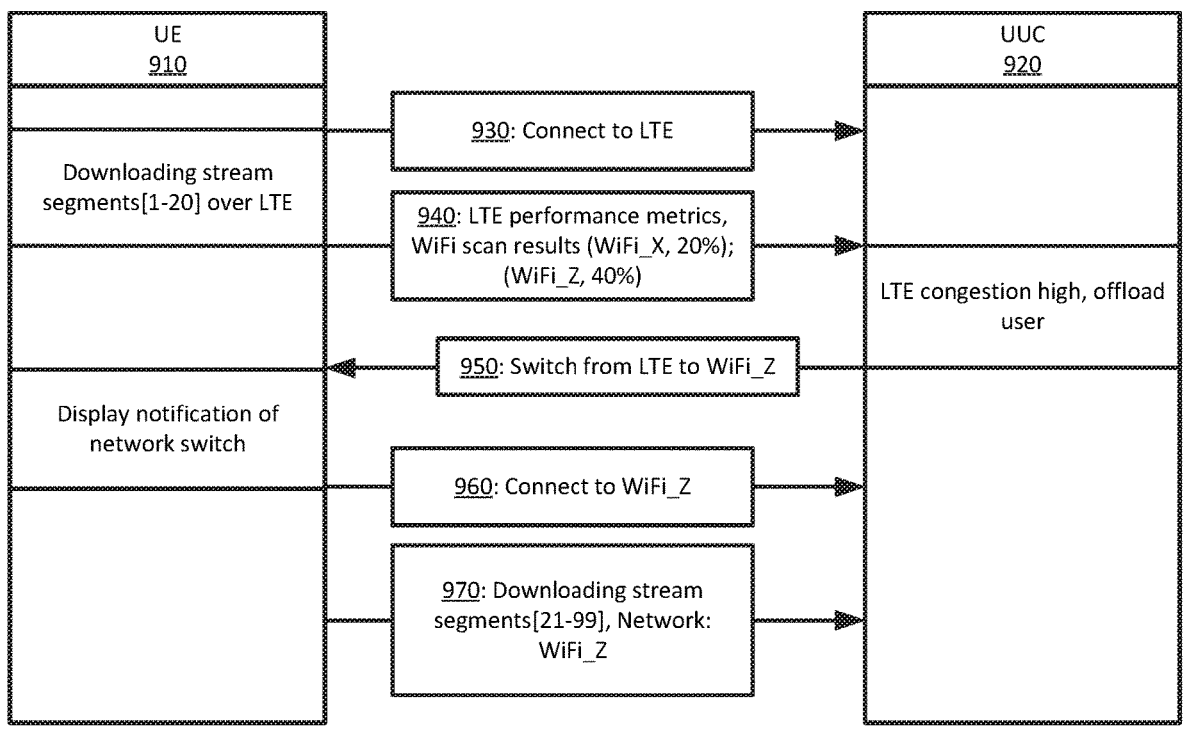
FIG. 9 illustrates an example of the UUC improving data services for a UE by directly updating settings of the UE.

In addition to, or instead of, potentially improving call quality as shown in the examples above, UUC 205 may also improve the sending and receiving of data. FIG. 9 illustrates an example of UUC 920 improving data services for UE 910 by directly updating settings of UE 910. Once again, UUC 920 may represent UUC 205 executing in core network 210, or may represent a component executing on UE 910. UE 910 may be one of UEs 270 from FIG. 2.

UE 910 may provide (at 930) a first set of device data (e.g., a CONNECTIVITY_CHANGE message) to UUC 920 in response to UE 910 connecting to an LTE network. As shown, UE 910 then begins downloading a first set of segments of a stream over the LTE network. The stream download may trigger an event that causes UE 910 to provide (at 940) a second set of device data to UUC 920. The second set of device data may include performance metrics of the LTE network as detected by UE 910, and WiFi network scan results identifying SSIDs of WiFi networks that are available to UE 910, as well as, various qualities of those WiFi networks. UUC 920 may, additionally or alternatively, obtain device data for the LTE network service region in which UE 910 operates, from other UEs 270 operating in that same service region or from the corresponding RAN or other equipment of the LTE network.

Based on the device data from one or more of UE 910, other UEs connected to the LTE network, and network equipment of the LTE network, UUC 920 may detect performance metrics indicative of a congested LTE service region (e.g., slow LTE network speed, excess latency, or excess packet loss). For instance, UUC 920 may detect that the LTE network service region in which UE 910 operates is congested in response to receiving device data from a threshold number of UEs operating in that same service region, or in response to the device data from those UEs indicating aggregate bandwidth utilization or aggregate download rate in excess of one or more thresholds. Alternatively, UUC 920 may detect that UE 910 download of the stream over the LTE network could result in cost overages for the user based on the download rate of UE 910 and subscriber information obtained from the carrier network (e.g., remaining data usage for a current subscription period). Accordingly, UUC 920 may directly update (at 950) the settings of UE 910 to cause UE 910 to switch (at 960) from the LTE network to one of the available WiFi networks, in order to avoid data usage of the LTE network on behalf of UE 910. To cause the switch, UUC 920 may temporarily deactivate the LTE radio of UE 910 (e.g., for the remainder of the stream) or prioritize data download over the WiFi network through the settings update.

After switching from the LTE network to an available WiFi network, UE 910 may resume (at 970) downloading the remainder of the stream. UE 910 can also notify the user of the update and network switching with an onscreen message.

Device data from the carrier network can open additional possibilities for UUC 205 updating of UE settings. Device data pertaining the data usage that is remaining on a subscriber plan can alter when and which settings are updated. For example, UCC 205 can update settings that cause a particular UE 270 to switch from an LTE network to a WiFi network when the remaining data usage on the subscriber plan is less than one hundred megabytes, or when the remaining data usage is less than one hundred megabytes and there is more than five days remaining on the current billing cycle. UUC 205 may not, however, provide the update to the particular UE 270 when the data usage on the subscriber plan is greater than one hundred megabytes, or when there is less than five days remaining on the current billing cycle. UCC 205 may therefore provide the updates according to a sliding scale that is based on one or more variables from device data provided by the targeted UE 270, other UEs 270, and the network equipment from the core network 210.

In some embodiments, UUC 205 may use device data from a set of UEs 270 or from other network carrier equipment to predict service quality issues and to preemptively correct those issues for potentially affected UEs. For example, UEs 270 operating in different areas of a particular LTE service region may provide UUC 205 with device data relating to signal strength experienced by each UE 270 in the particular LTE service region, as well as, geolocation information pinpointing the location in the particular LTE service region at which each UE 270 experiences the reported signal strength. The geolocation information can be coordinates that are obtained from a Global Positioning System (GPS) module of a UE, network triangulation, or other techniques. This device data can be temporally qualified. In other words, UUC 205 can associate a time of day, day of week, etc. at which device data indicates congestion at the particular LTE service region. UUC 205 can then track movements of a particular UE 270 within the particular LTE service region based on the device data provided by the particular UE 270 or other location tracking services of the network carrier or the particular UE 270. In response to UUC 205 detecting the particular UE 270 moving to an area in the particular LTE service region that the device data from other UEs 270 reported to have poor signal quality, UUC 205 may preemptively update settings of the particular UE 270. Similarly, in response to UUC 205 detecting the particular UE 270 moving into the particular LTE service region at a time of day when the particular LTE service region is likely congested, UUC 205 may preemptive update settings of the particular UE 270. The updated settings may activate the WiFi radio of the particular UE 270 and enable connection to the WiFi network, or preemptively and temporarily switch the particular UE 270 to a slower 3G network that has better signal quality in the area. UUC 205 may set a timer or one or more events at which UUC 205 reverts the updated settings back to their original values or states. Alternatively, expiration of the timer or triggering of the one or more events may automatically revert the settings back to their original value or states without further action by UUC 205.

As another example, UUC 205 may receive device data from several UEs 270 indicating convergence of UEs 270 to a common location (e.g., a stadium, arena, or other venue). The number of UEs 270 in that common location may exceed CDMA, LTE, or other network capacity for that common location. UUC 205 may use the aggregate device data to selectively switch different subsets of UEs 270 to different networks, such that all call or data requests do not route through any single network even though UEs 270 may connect to a single network by default.

Figure 10:
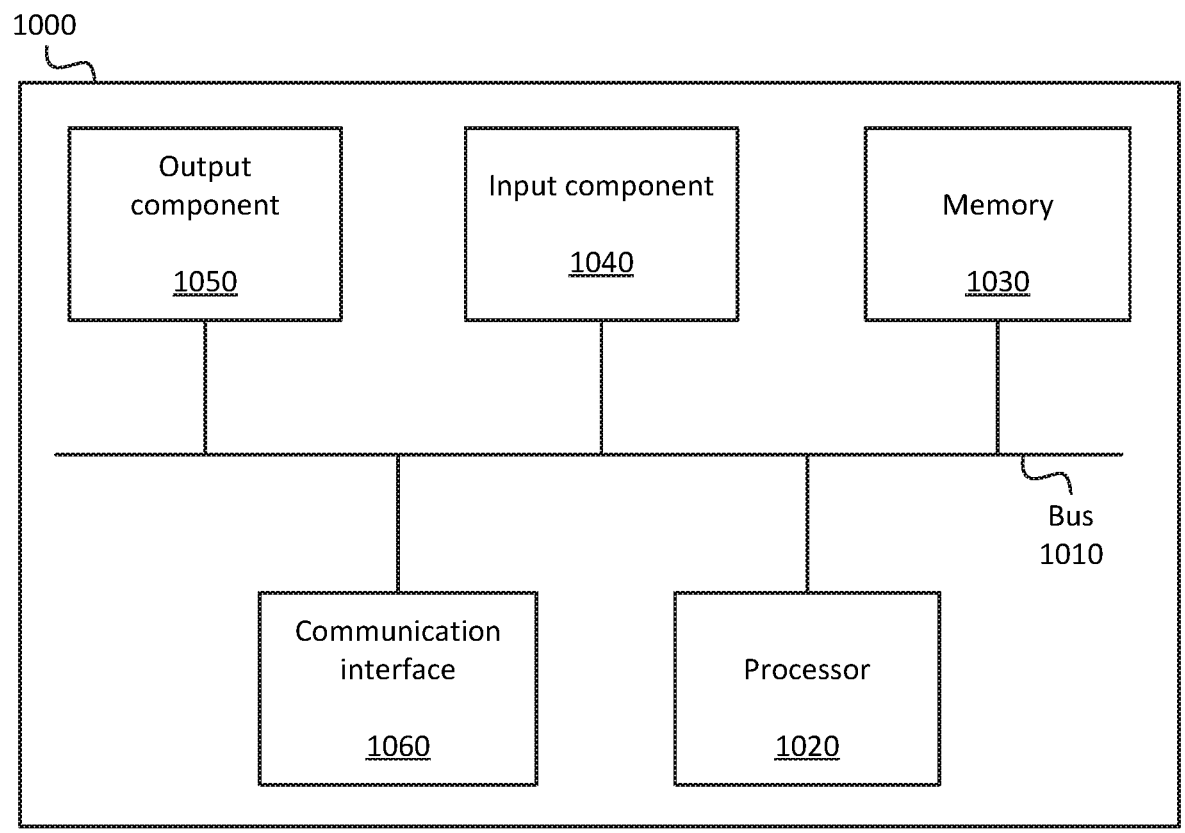
FIG. 10 illustrates example components of one or more devices, according to one or more embodiments described herein.

FIG. 10 is a diagram of example components of device 1000. Device 1000 may be used to implement certain of the devices described above, such as UEs or network equipment on which the UUC executes. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 5-9, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
   receive device data from a particular user equipment ("UE") accessing a first network, the device data indicating at least one setting associated with the particular UE, the device data further including one or more performance metrics associated with the first network;
   determine that the particular UE is located in a particular geographical region;
   receive historical device data associated with one or more different UEs when the one or more different UEs were located in the same particular geographical region, the historical device data indicating one or more times during which a repeated network event occurs;
   determine, based on the historical device data, that a present time corresponds to the one or more times during which the repeated network event occurs;
   determine, based on the device data, the historical device data, and the determination that the present time corresponds to the one or more times during which the repeated network event occurs, that the particular UE should access a second network in lieu of the first network; and
   cause the particular UE to change, based on determining that the particular UE should communicate via the second network, the at least one setting of the particular UE, the change causing the particular UE to access the second network.

2. The device of claim 1, wherein executing the processor-executable instructions, to change the at least one setting of the particular UE, further causes the one or more processors to:
   provide, to the particular UE, via the first network, an over-the-air message changing the at least one setting from a first state restricting access to the wireless services over the second network to a second state enabling access to the wireless services over the second network.

3. The device of claim 1, wherein the processor-executable instructions further include processor-executable instructions to:
directly modify on the particular UE, without user involvement, the at least one setting from a first state restricting access to the wireless services over the second network to a second state enabling access to the wireless services over the second network.

4. The device of claim 1, wherein the at least one setting is associated with at least first and second values, the first value of the at least one setting causing the particular UE to not access the wireless services over the second network, the second value of the at least one setting enabling the particular UE access to the wireless services over the second network, and wherein changing the at least one setting comprises changing the at least one setting from the first value to the second value.

5. The device of claim 1, wherein executing the processor-executable instructions, to change the at least one setting of the particular UE, further causes the one or more processors to:
enable a disabled feature or functionality of the particular UE to access the wireless services from the second network.

6. The device of claim 1, wherein executing the processor-executable instructions, to change the at least one setting of the particular UE, further causes the one or more processors to:
cause the particular UE to activate an inactive network radio, used to access the second network, of the particular UE.

7. The device of claim 6, wherein the network radio is a first network radio, wherein executing the processor-executable instructions, to change the at least one setting of the particular UE, further causes the one or more processors to:
cause the particular UE to deactivate an active second network radio, via which the particular UE accesses the first network, wherein the particular UE accesses the second network, in lieu of the first network, in response to the activating of the first network radio and the deactivating of the second network radio.

8. The device of claim 1, wherein executing the processor-executable instructions further causes the one or more processors to:
hand off the particular UE from the first network to the second network; and
resume, in response to the handoff, communicating with the particular UE via the second network.

9. The device of claim 1, wherein executing the processor-executable instructions further causes the one or more processors to:
modify at least one of:
a timer or
a parameter,
the timer or the parameter controlling the particular UE switching between the first network and the second network.

10. The device of claim 1, wherein executing the processor-executable instructions, to change the at least one setting of the particular UE, further causes the one or more processors to:
cause the particular UE to blacklist, disconnect, or remove the first network from a list of available networks, wherein the list of available networks comprises the second network.

11. The device of claim 1, wherein executing the processor-executable instructions further causes the one or more processors to:
determine, based on the historical device data, that a measure of congestion of the first network exceeds a threshold measure of congestion,
wherein the determining that the particular UE should access a second network in lieu of the first network is further based on the determining that the measure of congestion of the first network exceeds the threshold measure of congestion.

12. A non-transitory computer-readable medium, storing a set of processor-executable instructions, which, when executed by one or more processors of a device associated with a wireless telecommunications network, cause the one or more processors to:
receive device data from a particular user equipment ("UE") accessing wireless a first network, the device data indicating at least one setting associated with the particular UE, the device data further including one or more performance metrics associated with the first network;
determine that the particular UE is located in a particular geographical region;
receive historical device data associated with one or more different UEs when the one or more different UEs were located in the same particular geographical region, the historical device data indicating one or more times during which a repeated network event occurs;
determine, based on the historical device data, that a present time corresponds to the one or more times during which the repeated network event occurs;
determine, based on the device data, the historical device data, and the determination that the present time corresponds to the one or more times during which the repeated network event occurs, that the particular UE should access a second network in lieu of the first network; and
cause the particular UE to change, based on determining that the particular UE should communicate via the second network, the at least one setting of the particular UE, the change causing the particular UE to access the second network.

13. The non-transitory computer-readable medium of claim 12, wherein the processor-executable instructions, to change the at least one setting of the particular UE, further include processor-executable instructions to:
directly modify on the particular UE, without user involvement, the at least one setting from a first state restricting access to the wireless services over the second network to a second state enabling access to the wireless services over the second network.

14. The non-transitory computer-readable medium of claim 12, wherein the processor-executable instructions, to change the at least one setting of the particular UE, further include processor-executable instructions to:
enable a disabled feature or functionality of the particular UE to access the wireless services from the second network.

15. The non-transitory computer-readable medium of claim 12, wherein the processor-executable instructions, to change the at least one setting of the particular UE, further include processor-executable instructions to:

cause the particular UE to activate an inactive network radio, used to access the second network, of the particular UE.

16. The non-transitory computer-readable medium of claim 15, wherein the processor-executable instructions, to change the at least one setting of the particular UE, further include processor-executable instructions to:
cause the particular UE to deactivate an active second network radio, via which the particular UE accesses the first network, wherein the particular UE accesses the second network, in lieu of the first network, in response to the activating of the first network radio and the deactivating of the second network radio.

17. A method comprising:
receiving device data from a particular user equipment ("UE") accessing a first network, the device data indicating at least one setting associated with the particular UE, the device data further including one or more performance metrics associated with the first network;
determining that the particular UE is located in a particular geographical region;
receiving historical device data associated with one or more different UEs when the one or more different UEs were located in the same particular geographical region, the historical device data indicating one or more times during which a repeated network event occurs;
determining, based on the historical device data, that a present time corresponds to the one or more times during which the repeated network event occurs;
determining, based on the device data, the historical device data, and the determination that the present time corresponds to the one or more times during which the repeated network event occurs, that the particular UE should access a second network in lieu of the first network; and
causing the particular UE to change, based on determining that the particular UE should communicate via the second network, the at least one setting of the particular UE, the change causing the particular UE to access the second network.

18. The method of claim 17, wherein changing the at least one setting includes:
causing the particular UE to activate an inactive second network feature of the particular UE.

19. The method of claim 18, wherein changing the at least one setting includes:
causing the particular UE to deactivate an active first network setting providing the particular UE access to the first network, wherein the particular UE accesses the second network in response to the activating of the second network feature.

20. The method of claim 17, wherein changing the at least one setting includes:
causing the particular UE to enable a Voice-Over-LTE ("VoLTE") or a Voice-Over-WiFi ("VoWiFi") calling feature available on the second network.

* * * * *